United States Patent [19]
Boyle

[11] 3,871,636
[45] Mar. 18, 1975

[54] ENERGY ABSORBING DEVICE
[75] Inventor: Joseph R. Boyle, Rochester, N.H.
[73] Assignee: McCord Corporation, Detroit, Mich.
[22] Filed: Aug. 3, 1971
[21] Appl. No.: 168,660

[52] U.S. Cl.................................. 267/140, 293/60
[51] Int. Cl............................................. F16f 1/44
[58] Field of Search .......... 267/140, 145, 141, 152, 267/153; 293/60

[56] References Cited
UNITED STATES PATENTS
| | | | |
|---|---|---|---|
| 2,231,346 | 2/1941 | Riesing et al. | 267/145 |
| 2,874,669 | 2/1959 | Norman | 267/140 |
| 3,181,849 | 5/1965 | Mitchell | 267/140 |
| 3,473,836 | 10/1969 | Halfer | 267/140 |

Primary Examiner—James B. Marbert
Attorney, Agent, or Firm—Barnard, McGlynn & Reising

[57] ABSTRACT

An energy absorbing device including a rigid base member and a flexible covering, the former cooperating with the latter to define an enclosed space which is subdivided by a plurality of resilient laterally spaced rib members. The rib members temporarily buckle upon impact of an object against the flexible covering.

9 Claims, 11 Drawing Figures

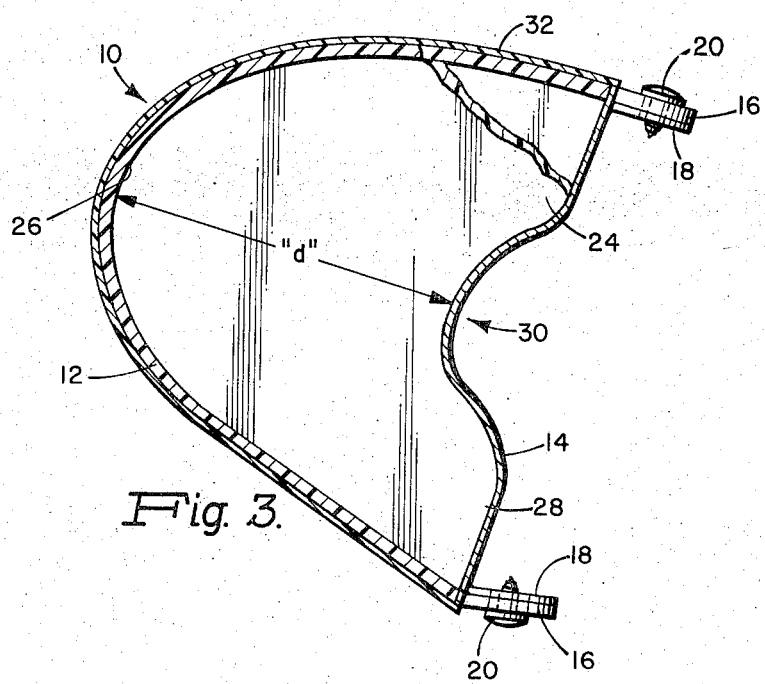
Fig. 3.
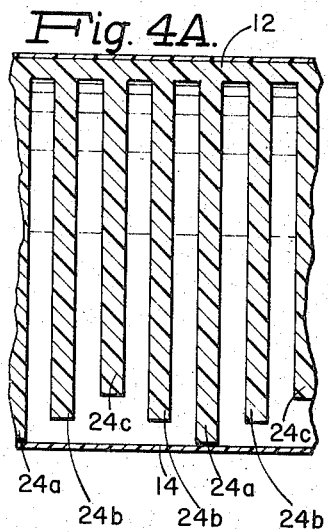
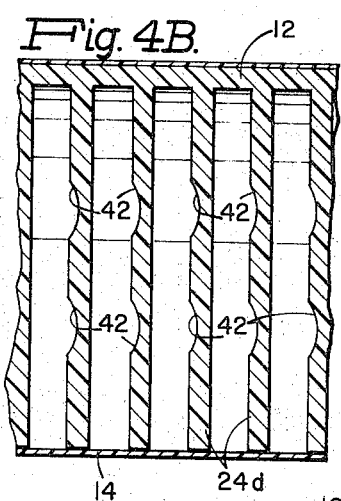
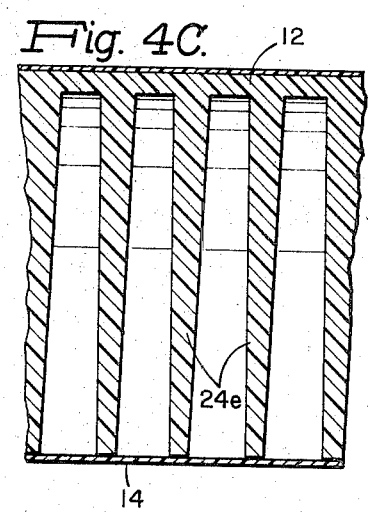
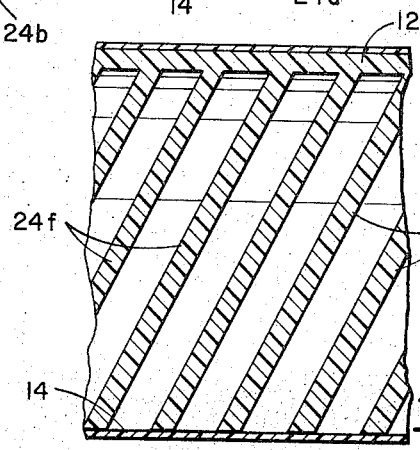

PATENTED MAR 18 1975 3,871,636

ENERGY ABSORBING DEVICE

DESCRIPTION OF THE INVENTION

This invention relates generally to energy absorbing devices, and is particularly concerned with the use of such devices to protect vehicular passengers during sudden stops or collisions.

An important object of the present invention is to provide a highly efficient energy absorbing device which operates in a passive manner, the term "passive" in this context meaning without requiring action on the part of a passenger, such as for example the buckling of a belt or the pushing of a button, and without the use of moving parts such as inflatable elements which are triggered by either manually or automatically actuated switches.

Another object of the present invention is to provide an energy absorbing device which requires minimum space and which is adaptable to the various designs and style requirements of the automobile industry. A further object of the present invention is the provision of an energy absorbing device which is capable of undergoing numerous impacts without requiring repair or replacement. Still another object of the present invention is to avoid the problems inherent in systems which rely on the deployment of inflatable restraints. Such problems include a loud noise and a marked pressure increase in the passenger compartment at the instant that the inflatable restraint is deployed, and the difficulties which have heretofore been encountered in developing impact sensing units which operate reliably and are tamper-proof.

Another object of the present invention is to provide a device whose energy absorption characteristics may be adjusted by varying the arrangement and geometry of component parts.

These and other objects and advantages of the present invention will become more apparent as the description proceeds with the aid of the accompanying drawings, wherein:

FIG. 3 is a sectional view taken along line 3—3 of FIG. 2;

FIGS 4A–4D are horizontal sectional views similar to FIG. 2 illustrating some of the modifications which may be made to the shape and design of the internal resilient ribs in order to vary the energy absorption characteristics of the device;

Figure 1:
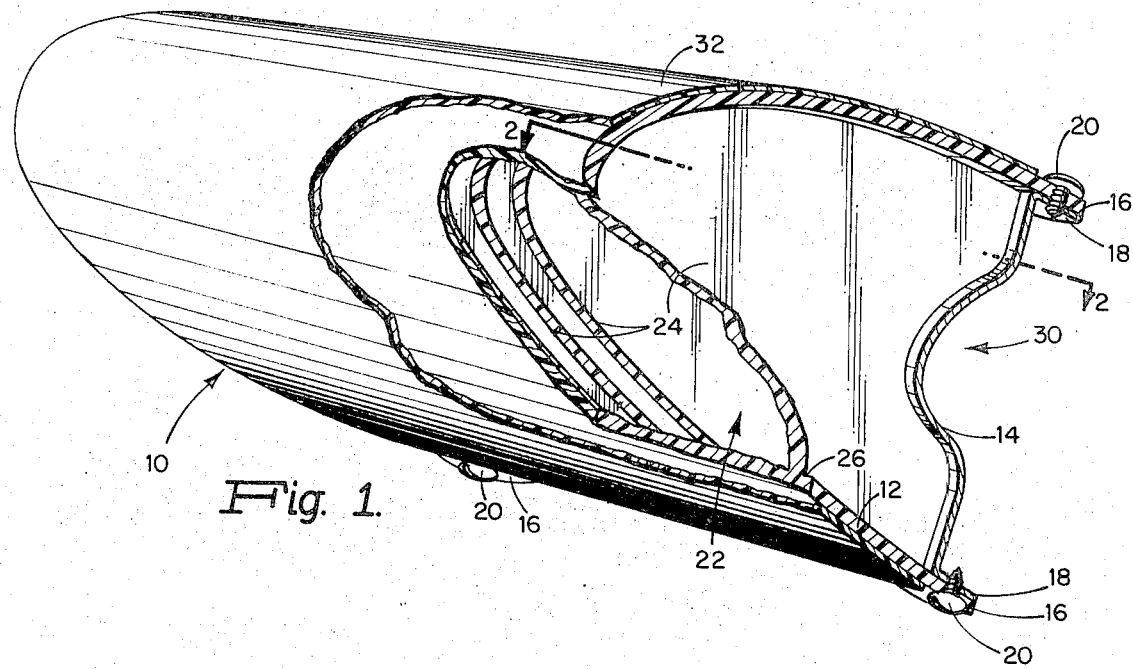
FIG. 1 is a perspective view, with portions broken away, of an automobile dashboard embodying the concepts of the present invention.
Figure 2:
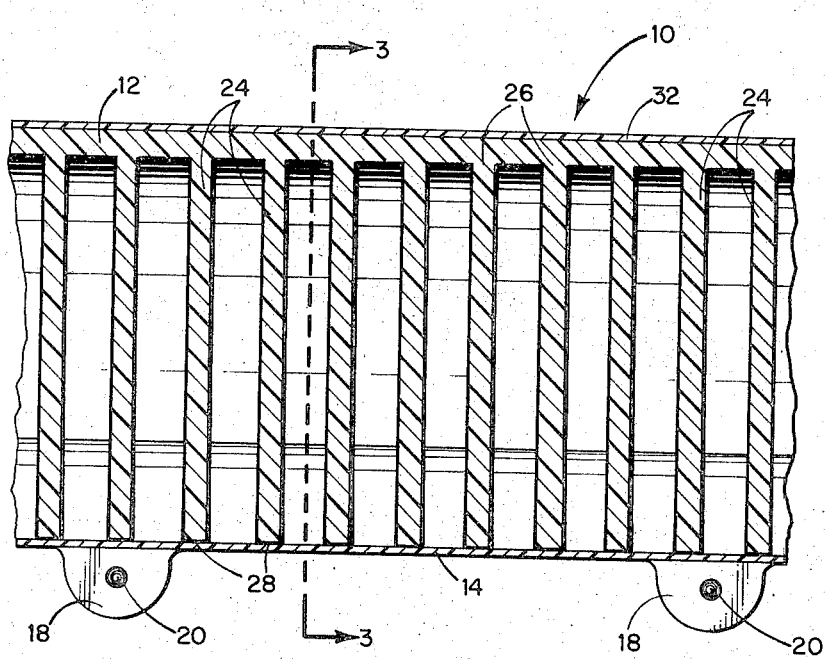
FIG. 2 is a horizontal sectional view taken along line 2—2 of FIG. 1.

Referring more particularly to the drawings, there is shown in FIGS. 1–3 a portion of an automobile dashboard 10 embodying the concepts of the present invention. Dashboard 10 includes a flexible curved shell 12 which is attached by any convenient means to a rigid base member 14. Base member 14 may conveniently comprise an integral part of the automobile frame. As herein depicted, the shell 12 is provided with integral rearwardly extending ears 16 which overlap rearwardly extending flanges 18 on the base element 14. Conventional means such as for example machine screws 20 may be employed to secure the ears 16 to the flanges 18.

The shell 12 cooperates with the base member 14 to enclose a cavity generally indicated in FIG. 1 at 22. Cavity 22 is subdivided into a plurality of smaller compartments by laterally spaced ribs 24 which are integrally joined as at 26 to the shell 12. In the embodiment shown in FIGS. 1–3, the ribs 24 extend rearwardly from shell 12, with their rear edges abutting the base member 14 as at 28. The shell 12 and ribs 24 are preferably molded of a relatively stiff yet resilient material such as for example microcellular urethane foam. The base member 14 and the abutting rear edges of the ribs 24 may if desired be curved as shown in the drawings at 30. Also, it may be desirable to cover the shell 12 with a decorative skin 32 of plastisol or other like material having an outer surface suitably textured and colored to match the decor of the automobile interior.

In use, the dashboard 10 performs as follows: upon impact of an object against exterior surface of the device, the shell 12 is pushed inwardly towards the base member 14. At the same time, the ribs 24 adjacent to the point of impact buckle. The combined inward deflection of shell 12 and buckling of the ribs 24 absorbs the kinetic energy of the impacting object while at the same time providing a cushioning effect. Energy absorption continues until the forward movement of the impacting object is dissipated, at which point the resilient ribs 24 and shell 12 return to their pre-impact positions without transmitting substantially equal kinetic energy back into the impacting object. Heat dissipation accounts primarily for the energy differential. It will be understood that the "fit" between the outer shell 12 and base member 14 is not air-tight. Hence, air will be allowed to escape from and then return into cavity 22 during each impact-recovery cycle.

The above operation is further illustrated by the results of a test on a sample device of the type shown in FIGS. 1–3, but without an exterior plastisol covering 32 on the shell 12. The shell 12 and integral ribs 24 of the test sample were molded of a microcellular urethane foam having a density of 65 lbs./ft.$^3$. The shell and ribs were ¼ inch thick, and the lateral spacing between ribs was three-fourths inch. The distance "d" (See FIG. 3) between the nose of the shell and the base member was 6 inches.

The test equipment used to evaluate the above-sample consisted of a 15 lb. spherical head form. The head form was dropped from a suitable height to achieve a velocity of 15 m.p.h. at the instant of impact with the test sample.

A piezoelectric accelerometer was connected to the head form to produce an electric signal proportional to the head form acceleration. The signal was recorded relative to the time base on one channel of a dual trace oscilloscope. The second channel was connected to a slide wire resistor which recorded voltage change relative to time as the head form changed position. This channel was calibrated by positioning the head form at the impact point and taking an "0" centimeter reading on the scope. The head form was then moved a given number of inches and the number of cm's on the scope scale noted. The calibration factor was then calculated as number of cm./number of inches.

(for example, 8.30 c./10in. = 0.83 in/cm.)

Figure 7:
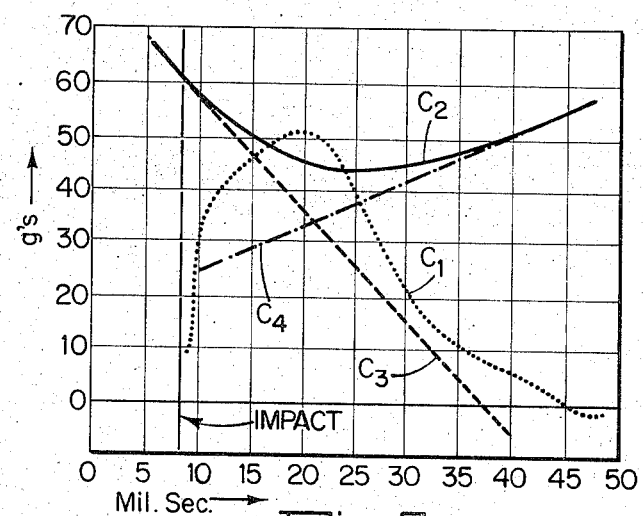

FIG. 7 illustrates the curves generated by the above equipment during a typical test run. Curve $C_1$ is the "g" curve. By Newton's law, $F = ma =$ wt. $\times$ 32.2 $g/g_c =$ wt. $\times$ "g". Curve $C_2$ represents displacement. The slope of curve $c_2$ (depicted by line $c_3$) prior to impact is the impact velocity, i.e., $V_1 = 6.6 (0.031)(0.830)(12) = 2.13$ ft/sec.

The rebound velocity is computed using the slope of the curve $c_2$ (depicted by line $c_4$) after g's, in this example, after 38 m.sec. The slope of line $c_4$ is thus $V_r = 3.90/0.044 (0.830)(12) = 8.9$ ft/sec.

The kinetic energy absorbed is $KE = (1/2)(15/32.2)[(21.3)^2 - (8.9)^2] = 87$ ft.lbs.

Figure 6:
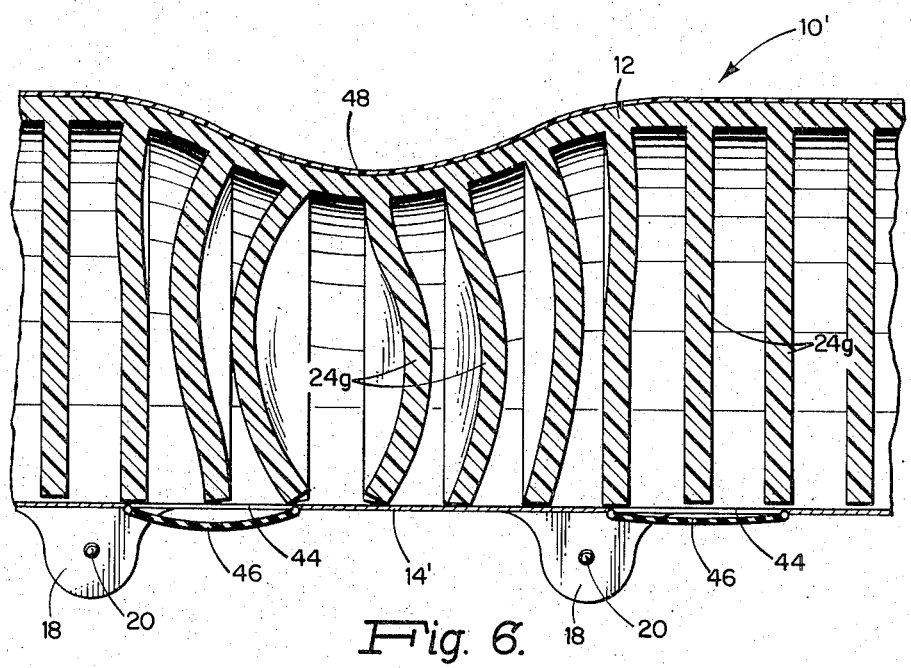
FIG. 6 is a horizontal sectional view taken through the embodiment shown in FIG. 5 at the instant that an object is impacted thereagainst; and, FIGS. 7 and 8 set forth curves illustrating the results of a test performed on a sample device of the type shown in FIGS. 1–3.

The force-deflection curve $c_5$ shown in FIG. 7 was computed from the curves $c_1$ and $c_2$ shown in FIG. 6. The area 36 enclosed $c_5$ represents the next kinetic energy absorbed by the sample device during the experiment described above. The area 38 underlying curve $c_5$ represents the energy returned to the head form during recoil.

Ideally, the most efficient force-deflection curve for utilizing the limited space available in an automobile is that of a rectangle bounded by the maximum allowable load in pounds and the maximum deflection allowable. These figures are currently being estimated at 67 g's and 3 ¾ inch at 30 m.p.h.

Figure 8:
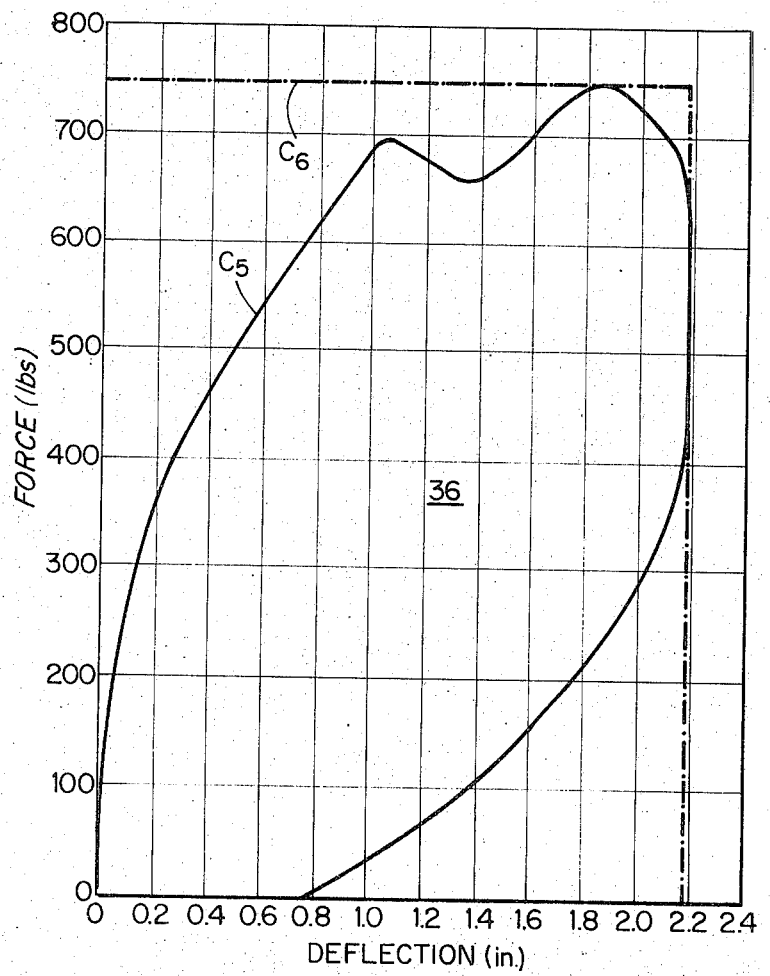

The ideal curve for the condition described under 15 m.p.h. impact velocity is shown at $c_6$ in FIG. 8. It will be understood by those skilled in the art that curve $c_5$ is close to curve $c_6$ which represents ideal conditions when compared to alternate nonbuckling recoverable schemes, for example conventional urethane crash pads.

The shape of the force-deflection curve can be adjusted to make curve $c_5$ approach more closely the ideal curve $c_6$. Examples of possible modifications to the resilient ribs 24 are shown in FIGS. 4A–4D. In FIG. 4a, ribs 24a extend from the shell 12 to the base member 14, with shorter ribs 24b and 24c being interspersed therebetween. In FIG. 4B, the ribs 24d are provided with transverse grooves 42, while in FIG. 4C, the ribs 24e have a somewhat tapered cross-sectional configuration. FIG. 4D illustrates still another modification where the ribs 24f are angularly disposed in relation to the outer shell 12 and base member 14.

Figure 5:
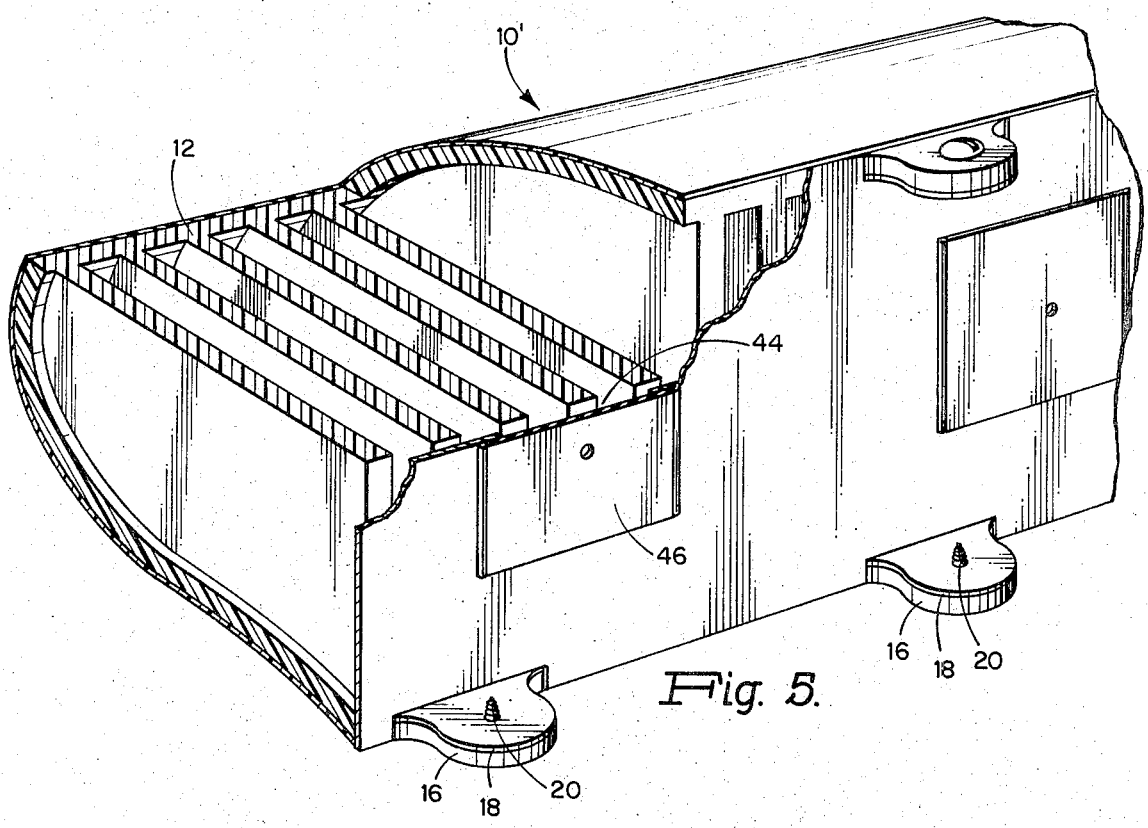
FIG. 5 is a rear perspective view, again with portions broken away, illustrating another embodiment of the invention.

FIGS. 5 and 6 illustrate an alternate embodiment 10' which is similar to that disclosed at 10 in FIGS. 1–3 in that it also includes a shell 12 with resilient inwardly extending spaced parallel ribs 24g. The base member 14' presents a flat surface which is spaced from the ends of the ribs 24g. The base member 14' is further provided with a plurality of spaced ports 44 each being covered by a flexible valve member 46. When the device 10' is impacted as at 48, the outer shell 12 and its covering 32 are deflected inwardly, and the resilient ribs 24g are bent as shown. At the same time, the valve members 46 deflect outwardly to allow air to escape through ports 22. As the device recovers following impact, the rate at which incoming air is admitted is to some extent throttled by the necessity of having to leak around the closed valve members 46. This throttling action reduces the recoil characteristics of the device.

Having thus described several embodiments of the present invention, the advantages to be derived from its use will now be more evident to those skilled in the art.

Among these advantages is the passive nature of the device, which obviates any necessity for action on the part of a vehicle passenger. The device is fully recoverable after minor impacts, as opposed to inflatable restraints having components which require replacement after each use. The present invention does not include moving parts, does not require actuation by remote switching mechanisms, and hence is inherently reliable and tamper-proof.

It is my intention to cover all changes and modifications of the embodiments herein chosen for purposes of disclosure which do not depart from the spirit and scope of the invention as defined by the claims appended hereto.

I claim:

1. Energy absorbing apparatus comprising: a base member extending laterally across the direction along which an impacting object may be expected to travel towards said apparatus; a flexible covering cooperating with said base member to define an interior chamber, said chamber being subdivided by a plurality of resilient laterally spaced and independent rib members extending between said base member and said covering, the rear edge of at least some of said rib members being immediately adjacent to said base member and the remaining edges being joined to said covering such that said rib members are adapted to temporarily buckle independently of one another upon impact of an object against said covering.

2. The apparatus as claimed in claim 1 comprising additional rib members, the rear edges of which are spaced from said base member and the remaining edges of which are joined to said covering.

3. The apparatus as claimed in claim 1 wherein said covering and said rib members are molded as a single integral unit.

4. The apparatus as claimed in claim 1 wherein each said rib members has a generally rectangular cross-section with two parallel side surfaces normal to the surface of said covering.

5. The apparatus as claimed in claim 4 wherein at least one of the side surfaces on said rib members is indented at suitable intervals to vary the energy absorption characteristics of the apparatus.

6. The apparatus as claimed in claim 1 wherein said rib members are parallel with each other and disposed at an angle relative to the direction of impact of a body against said covering.

7. The apparatus as claimed in claim 1 wherein each of said rib members is provided with a tapered cross-section with the area of maximum thickness being adjacent to the front area of said covering.

8. The apparatus as claimed in claim 1 further characterized by at least one aperture in said base member, and valve means associated with said aperture for controlling the rate at which air may be expelled from and subsequently drawn into said chamber.

9. An energy absorbing device comprising: a rigid base member; a plurality of laterally spaced independent and flexible rib members normal to said base member, at least some of said rib members having a rear edge immediately adjacent to said base member with the remaining peripheral edges of said rib members being joined to and integral with a flexible outer covering whereby said rib members may buckle independently of one another.

* * * * *